(12) United States Patent
Shiraiwa et al.

(10) Patent No.: US 10,330,530 B2
(45) Date of Patent: Jun. 25, 2019

(54) REFERENCE LIGHT SOURCE DEVICE USED FOR CALIBRATION OF SPECTRAL LUMINANCE METER AND CALIBRATION METHOD USING SAME

(71) Applicant: Otsuka Electronics Co., Ltd., Osaka (JP)

(72) Inventors: Hisashi Shiraiwa, Koka (JP); Hiroyuki Sano, Omihachiman (JP)

(73) Assignee: Otsuka Electronics Co., Ltd., Osaka (JP)

( * ) Notice: Subject to any disclaimer, the term of this patent is extended or adjusted under 35 U.S.C. 154(b) by 0 days.

(21) Appl. No.: 15/560,493

(22) PCT Filed: Mar. 24, 2015

(86) PCT No.: PCT/JP2015/058991
§ 371 (c)(1),
(2) Date: Sep. 22, 2017

(87) PCT Pub. No.: WO2016/151778
PCT Pub. Date: Sep. 29, 2016

(65) Prior Publication Data
US 2018/0058927 A1    Mar. 1, 2018

(51) Int. Cl.
*G01J 1/44* (2006.01)
*G01J 3/02* (2006.01)
(Continued)

(52) U.S. Cl.
CPC .............. *G01J 1/44* (2013.01); *G01J 1/0295* (2013.01); *G01J 1/0407* (2013.01); *G01J 1/08* (2013.01);
(Continued)

(58) Field of Classification Search
CPC .... G01J 1/44; G01J 1/08; G01J 1/0407; G01J 2001/0481; G01J 2001/444; G01J 3/0254;
(Continued)

(56) References Cited

U.S. PATENT DOCUMENTS 3,932,023 A * 1/1976 Humer ................. G01J 1/04
                                                      385/35
4,770,530 A * 9/1988 Van Aken ............. G01J 3/0254
                                                      356/319
(Continued)

FOREIGN PATENT DOCUMENTS

JP    H05-231940 A    9/1993
JP    H05-264349 A    10/1993
(Continued)

OTHER PUBLICATIONS https://gis.stackexchange.com/questions/222554/difference-between-irradiance-and-radiance-remote-sensing-reflectance-and-water.*
(Continued)

*Primary Examiner* — Mohamed K Amara
(74) *Attorney, Agent, or Firm* — HEA Law PLLC

(57) ABSTRACT

A reference light source device for calibration of a spectral radiance meter includes an integrating sphere having a radiance reference plane, which is an opening; and a plurality of first optical ports, which are formed apart from each other in an outer wall of the integrating sphere to allow light rays with equivalent wavelength characteristics to enter an interior of the integrating sphere.

14 Claims, 10 Drawing Sheets

(51) Int. Cl.
| | |
|---|---|
| *G01J 3/10* | (2006.01) |
| *G01J 1/04* | (2006.01) |
| *G01J 1/08* | (2006.01) |
| *G01J 3/28* | (2006.01) |
| *G01J 1/02* | (2006.01) |

(52) U.S. Cl.
CPC .............. *G01J 3/02* (2013.01); *G01J 3/0297* (2013.01); *G01J 3/10* (2013.01); *G01J 3/28* (2013.01); *G01J 2001/0481* (2013.01); *G01J 2001/083* (2013.01); *G01J 2001/086* (2013.01); *G01J 2001/444* (2013.01); *G01J 2003/2866* (2013.01); *G01J 2003/2876* (2013.01)

(58) Field of Classification Search
CPC . G01J 1/0425; G01J 2003/2866; G01J 3/0218
See application file for complete search history.

(56) References Cited

U.S. PATENT DOCUMENTS

| | | | | |
|---|---|---|---|---|
| 4,939,376 | A * | 7/1990 | Woodruff | G01J 1/04 250/228 |
| 5,340,974 | A | 8/1994 | Zalewski | |
| 5,825,464 | A * | 10/1998 | Feichtner | G01S 7/4813 356/4.02 |
| 6,002,488 | A * | 12/1999 | Berg | G01J 3/0251 356/418 |
| 6,088,117 | A * | 7/2000 | Imura | G01J 3/0254 250/228 |
| 6,139,797 | A * | 10/2000 | Suzuki | G01N 21/553 356/445 |
| 6,369,883 | B1 * | 4/2002 | Clark | G01N 21/59 250/228 |
| 6,369,888 | B1 * | 4/2002 | Karpol | G01N 21/4788 356/237.4 |
| 6,535,278 | B1 * | 3/2003 | Imura | G01J 3/44 250/461.1 |
| 6,597,457 | B1 * | 7/2003 | Silverglate | G01J 1/04 356/236 |
| 8,067,738 | B1 * | 11/2011 | Heath | G01J 3/0262 250/338.1 |
| 8,976,256 | B2 * | 3/2015 | Hoelscher | H04N 5/2628 348/222.1 |
| 9,435,747 | B2 * | 9/2016 | Song | G01N 21/87 |
| 9,841,322 | B1 * | 12/2017 | Kemeny | G01J 3/0272 |
| 2001/0013572 | A1 * | 8/2001 | Kuderer | G01J 1/08 250/208.2 |
| 2002/0149773 | A1 * | 10/2002 | Martino | G01N 21/05 356/436 |
| 2003/0185004 | A1 | 10/2003 | Vogel et al. | |
| 2004/0233428 | A1 * | 11/2004 | Hart | G01J 1/04 356/319 |
| 2006/0132760 | A1 | 6/2006 | Imura | |
| 2006/0187457 | A1 * | 8/2006 | Atia | G01J 3/02 356/432 |
| 2006/0203240 | A1 * | 9/2006 | Ingleson | G01J 3/02 356/319 |
| 2008/0165349 | A1 * | 7/2008 | Huang | G01J 1/02 356/124 |
| 2008/0165350 | A1 * | 7/2008 | Huang | G01M 11/0285 356/124 |
| 2008/0297771 | A1 * | 12/2008 | Ou | G01J 1/02 356/73 |
| 2009/0051910 | A1 | 2/2009 | Imura | |
| 2011/0155926 | A1 * | 6/2011 | Ohkubo | G01J 3/0254 250/459.1 |
| 2011/0235036 | A1 * | 9/2011 | Ohkubo | G01J 3/02 356/328 |
| 2012/0101774 | A1 * | 4/2012 | Nishikawa | G01J 1/08 702/182 |
| 2013/0003064 | A1 * | 1/2013 | Allen | G01J 3/28 356/402 |
| 2013/0099102 | A1 * | 4/2013 | Park | G01J 1/04 250/208.2 |
| 2013/0141791 | A1 * | 6/2013 | Moore | G01J 3/0254 359/599 |
| 2013/0201321 | A1 * | 8/2013 | Chao | G01J 1/0474 348/79 |
| 2014/0021338 | A1 | 1/2014 | Ohkubo et al. | |
| 2014/0021340 | A1 | 1/2014 | Ohkubo et al. | |
| 2014/0247920 | A1 * | 9/2014 | Marks | G01N 23/20008 378/87 |
| 2014/0362380 | A1 * | 12/2014 | Harada | G01N 21/251 356/402 |
| 2015/0124249 | A1 * | 5/2015 | Yanagawa | G01J 1/08 356/300 |
| 2015/0339540 | A1 * | 11/2015 | Sato | G06K 9/60 382/110 |
| 2016/0273966 | A1 * | 9/2016 | Park | G01J 3/0254 |
| 2017/0307439 | A1 * | 10/2017 | Caucci | G01J 1/4228 |

FOREIGN PATENT DOCUMENTS

| | | |
|---|---|---|
| JP | H07-301565 A | 11/1995 |
| JP | H08-320273 A | 12/1996 |
| JP | 2932591 B2 | 8/1999 |
| JP | H11-258173 A | 9/1999 |
| JP | 2003-331631 A | 11/2003 |
| JP | 2006-177785 A | 7/2006 |
| JP | 2006-177813 A | 7/2006 |
| JP | 2009-052978 A | 3/2009 |
| JP | 2009-092397 A | 4/2009 |
| JP | 2010-078418 A | 4/2010 |
| JP | 2014-020952 A | 2/2014 |
| JP | 2015-045618 A | 3/2015 |

OTHER PUBLICATIONS http://www.instrumentsystems.com/applications/spectroradiometry-and-photometry/optical-quantities/.*
Espacenet English translation of JP 2006177813.*
English translation of the International Search Report for PCT/JP2015/058991.
Office Action dated Jan. 18, 2019, for corresponding KR Patent Application No. 10-2017-7021806 and English ranslation thereof.
Office Action dated Sep. 4, 2018, for corresponding JP Patent Application No. 2017-507231 and English translation thereof.
Office Action dated Nov. 6, 2018, for corresponding JP Patent Application No. 2017-507231 and English translation thereof.

* cited by examiner

REFERENCE LIGHT SOURCE DEVICE USED FOR CALIBRATION OF SPECTRAL LUMINANCE METER AND CALIBRATION METHOD USING SAME

CROSS REFERENCE TO RELATED APPLICATIONS

This application is a National Stage of International Application No. PCT/JP2015/058991 filed on Mar. 24, 2017. The contents of the above document is incorporated herein by reference in its entirety.

TECHNICAL FIELD

The present invention relates to a reference light source device used for calibration, of a spectral radiance meter, and a calibration method using the reference light source device.

BACKGROUND ART

In each of Patent Literatures 1 and 2 listed below, there is disclosed a reference light source enabling calibration of a spectral radiance meter. The reference light source disclosed in each of those literatures includes an integrating sphere, which, a light ray from a light emitting diode (LED) or a semiconductor laser enters from outside, and the light ray multiple-reflected inside the integrating sphere exits from a radiance reference plane, which is an opening formed in an outer wall of the integrating sphere. The spectral radiance meter to be calibrated is placed to be opposed to the radiance reference plane to measure a radiance of the radiance reference plane. Based on the thus measured radiance and a probable radiance of the above-mentioned radiance reference plane, which is measured separately by other measurement means, the spectral radiance meter to be calibrated is calibrated.

CITATION LIST

Patent Literature

[PTL 1] JP 2006-177785 A
[PTL 2] JP 2009-52978 A

SUMMARY OF INVENTION

Technical Problem

Theoretically, an integrating sphere is a device configured to evenly distribute a light flux in space with a light source arranged at the center of the integrating sphere. However, in the related-art radiance light source described above, the light ray from the light source enters the interior of the integrating sphere from the outside of the integrating sphere, and in a strict sense, the radiance of the radiance reference plane is not evenly distributed. In other words, radiance unevenness occurs on the radiance reference plane. Meanwhile, the spectral radiance meter to be calibrated is generally configured to perform spot measurement, with a small angle of measurement. Therefore, a measured radiance value may greatly differ depending on where on the radiance reference piano the spectral radiance meter to be calibrated is actually directed to.

Moreover, in the related-art reference light source described above, light rays from a plurality of individual light sources having different wavelength characteristics enter the interior of the integrating sphere from different positions on the outer wall of the integrating sphere, and hence states of the radiance unevenness on the radiance reference plane differ for the individual light sources. In other words, a change in radiance unevenness with a change of the individual light source greatly affects the measured radiance value from the spectral radiance meter to be calibrated.

As described above, with the related-art reference light source, in which the radiance evenness on the radiance reference plane is not ensured, here has been a problem in that reliability of the calibration or spectral radiance meter is inevitably low.

The present invention has been made in view of the above-mentioned problem, and therefore has a first object to provide a reference light source device, which is capable of suppressing radiance unevenness on a radiance reference plane of an integrating sphere.

It is a second object of the present invention to provide a reliable and simple method of calibrating a spectral radiance meter by using the reference light source device, with which the radiance unevenness on the radiance reference plane of the integrating sphere is suppressed.

Solution to Problem

In order to solve the above-mentioned problem, according to one embodiment of the present invention, there is provided a reference light source device, including: an integrating sphere having a radiance reference plane, which is an opening; and a plurality of first optical ports, which are formed apart from each other in an outer wall of the integrating sphere to allow light rays with equivalent wavelength characteristics to enter an interior of the integrating sphere. In the present invention, the term "integrating sphere" has a broad meaning including a device having a complete spherical shape, a half spherical shape, a one-eighth spherical segment shape, or other such shapes, which is configured to evenly distribute an incident light ray through multiple reflection on an inner wall surface.

Here, the plurality of first optical ports may be formed at a plurality of positions on the outer wall of the integrating sphere that are equidistant from a center of the radiance reference plane and that have rotational symmetry with respect to a rotational symmetry axis of the integrating sphere passing through the center of the radiance reference plane.

In this case, the integrating sphere may have a complete spherical shape. The plurality of first optical ports may be formed at a plurality of positions evenly dividing a circle on the radiance reference plane side of a circle having a maximum radius among circles obtained by cutting the integrating sphere by planes perpendicular to the rotational symmetry axis.

In addition, the integrating sphere may have a half spherical shape including a circular plate having the radiance reference plane at a center of the circular plate. The plurality of first optical ports may be formed at a plurality of positions on the circular plate that evenly divide a circle concentric with the circular plate.

In addition, the reference light source device may further include a single light source configured to supply a light ray to each of the plurality of first optical ports through an optical fiber. The optical fiber may have an equal length from the single light source to the each of the plurality of first optical ports.

In addition, the reference light source device may further include a plurality of second optical ports, which are formed apart from each other in the outer wall of the integrating sphere to allow light rays with equivalent wavelength characteristics, which are different from the wavelength characteristics of the plurality of first optical ports, to enter the interior of the integrating sphere.

In addition, the reference light source device may further include a measurement port, which is formed in the outer wall, of the integrating sphere, and to which a spectral irradiance meter, which is configured to measure a spectral irradiance, is connected.

In addition, the reference light source device may further include a wavelength calibration port, which is formed in the outer wall of the integrating sphere, to which a light source for wavelength calibration is connected, and which allows a light ray having a known wavelength peak to enter the interior of the integrating sphere.

According to one embodiment of the present invention, there is provided a method of calibrating a spectral radiance meter using the above-mentioned reference light source device, the method including the steps of: measuring a radiance of the radiance reference plane with a spectral radiance meter to be calibrated; measuring an irradiance of the radiance reference plane with a calibrated spectral irradiance meter; and calibrating the spectral radiance meter to be calibrated based on the measured radiance, the measured irradiance, and a relationship between the radiance and the irradiance.

Here, the step of calibrating may include converting the measured irradiance into a radiance based on the relationship.

In addition, the relationship may be obtained by associating an irradiance of the radiance reference plane, which is measured by the calibrated spectral irradiance meter, and a radiance of the radiance reference plane, which is measured by a calibrated spectral radiance meter.

In addition, the calibrated spectral irradiance meter may be obtained by calibrating, with a spectral irradiance standard lamp, the spectrometer to be calibrated, to which an optical system for using the spectrometer to be calibrated as a spectral irradiance meter is mounted.

DESCRIPTION OF EMBODIMENTS

A description is made below in detail of an embodiment of the present invention with reference to the drawings.

Figure 1:
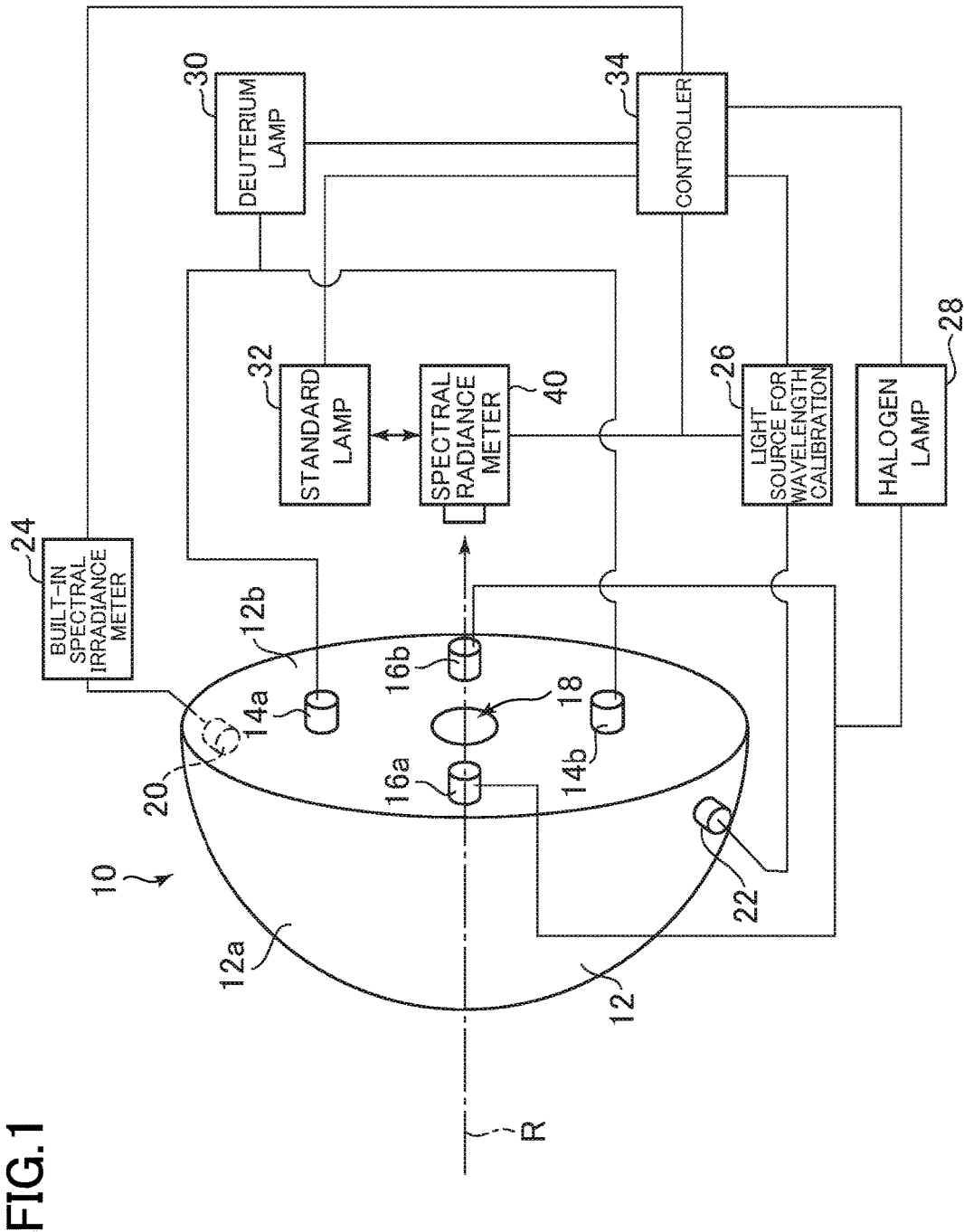
FIG. 1 is an overall diagram of a reference light source device according to one embodiment of the present invention, and a calibration system using the same.

FIG. 1 is an overall diagram of a reference light source device according to one embodiment of the present invention, and a calibration system using the same. In FIG. 1, an integrating sphere 12 is illustrated in a perspective view. Moreover, FIG. 2 is a plan view of the integrating sphere 12 having a half spherical shape when viewed from a transverse section side, and FIG. 3 is a cross-sectional view taken along the line III-III of FIG. 2.

Figure 2:
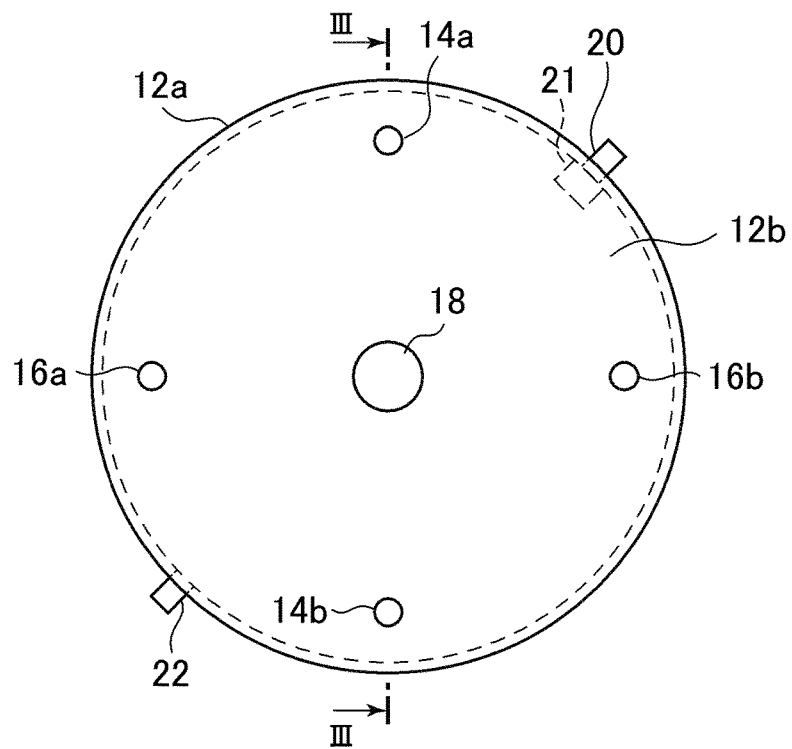
FIG. 2 is a plan view of the reference light source device.
Figure 3:
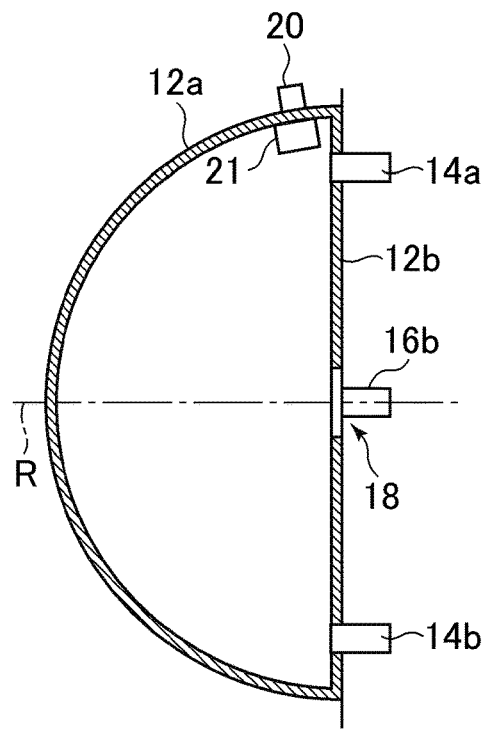
FIG. 3 is a cross-sectional view taken along the line III-III of FIG. 2.

As illustrated in FIG. 1 to FIG. 3, a reference light source device 10 includes the integrating sphere 12. The integrating sphere 12 is formed into a hollow half spherical shape, and its outer walls are formed of a half spherical shell portion 12a and a circular plate portion 12b. An inner surface of the circular plate portion 12b, which is the transverse section, is a mirror formed by aluminum vapor deposition or the like, and an inner surface of the half spherical shell portion 12a is a white, highly diffuse-reflective surface made of barium sulfate, a polytetrafluoroethylene (PTFE) sinter, or the like. A radiance reference plane 18, which is a circular opening, is formed at the center of the circular plate portion 12b. The integrating sphere 12 has a three-dimensional shape that has n-fold symmetry (n is any integer of 2 or more) with respect to a rotational symmetry axis R that passes through the center of the radiance reference plane 18 and is perpendicular to the circular plate portion 12b. With the integrating sphere 12 having the half spherical shape, the entire device can be made compact as compared to an integrating sphere having a complete spherical shape, which is to be described later, and an amount of light arriving at the radiance reference plane 18 can be made about twice.

In the circular plate portion 12b, in order to allow a light ray from a halogen lamp 28, which is a first light source, to enter the interior of the integrating sphere 12, two first optical ports 16a and 16b are formed. Positions of the first optical ports 16a and 16b are equidistant from those positions to the center of the radiance reference plane 18, and are set to have 2-fold symmetry with respect to the rotational symmetry axis R. In other words, the first optical ports 16a and 16b are formed at positions evenly dividing a circle concentric with the radiance reference plane 18 into two. To the first optical ports 16a and 16b, as described above, the light ray from the halogen lamp 28, which is a single light source, is guided through an optical fiber that is formed into a Y shape and branches halfway. Lengths of the optical fiber from the halogen lamp 28 to the first optical ports 16a and 16b are equal to each other. Therefore, even when the halogen lamp 28 is deteriorated and wavelength characteristics are changed, light rays having the same wavelength characteristics always exit from the first optical ports 16a and 16b.

Similarly, in the circular plate portion 12b, in order to allow a light ray from a deuterium lamp 30, which is a second light source, to enter the interior of the integrating sphere 12, two second optical ports 14a and 14b are formed. Positions of the second optical ports 14a and 14b are also equidistant from those positions to the center of the radiance reference plane 18, and are adjusted to have 2-fold symmetry with respect to the rotational symmetry axis R. In other words, the second optical ports 14a and 14b are also formed at positions evenly dividing a circle passing through the center of the radiance reference plane 18 into two. Here, the first optical ports 16a and 16b and the second optical ports 14a and 14b are formed at positions shifted from one another by 90°. To the second optical ports 14a and 14b, as described above, the light ray from the deuterium lamp 30, which is a single light source, is guided through an optical fiber that is formed into a Y shape and branches halfway. Lengths of the optical fiber from the deuterium lamp 30 to the second optical ports 14a and 14b are equal to each other. Therefore, even when the deuterium lamp 30 is deteriorated and wavelength characteristics are changed, light rays having the same wavelength characteristics always exit from the second optical ports 14a and 14b. The halogen lamp 28 emits a light ray in a visible and near-infrared region, and the deuterium lamp 30 emits a light ray in an ultraviolet region.

The positions at which the first optical ports 16a and 16b and the second optical ports 14a and 14b are mounted are not limited to those described above, and the first optical ports 16a and 16b and the second optical ports 14a and 14b may be formed in the half spherical shell portion 12a of the integrating sphere 12. In this case also, it is desired that the first optical ports 16a and 16b and the second optical ports 14a and 14b be formed at a plurality of positions that are equidistant from the center of the radiance reference plane 18 and that have rotational symmetry with respect to the rotational symmetry axis R of the integrating sphere 12 passing through the center of the radiance reference plane 18. In this case, it is desired that a required number of light-shielding walls be provided on the inner surfaces of the integrating sphere 12 so that light rays emitted from the first optical ports 16a and 16b and the second optical ports 14a and 14b do not reach the radiance reference plane 18. In this regard, when the first optical ports 16a and 16b and the second optical ports 14a and 14b are formed in the circular plate portion 12b as described above, such light-shielding walls are unnecessary, and manufacturing is easy because processing may be performed on a plate.

On an edge portion of the half spherical shell portion 12a, there are further formed a measurement port 20, to which a built-in spectral irradiance meter 24 is connected through an optical fiber, and a wavelength calibration port 22, to which a light source for wavelength calibration 26 is connected through an optical fiber. As described later, the built-in spectral irradiance meter 24 is configured to measure a radiance of the radiance reference plane 18, which serves as a reference for calibrating a spectral radiance meter 40 to be calibrated. On the inner surface of the half spherical shell portion 12a, an annular light-shielding wall 21 is erected around the measurement port 20 so that the light rays emitted from the first optical ports 16a and 16b and the second optical ports 14a and 14b do not directly reach the measurement port 20. The light source for wavelength calibration 26 includes a mercury lamp and a neon lamp, for example, and emits a light ray having a known wavelength peak (mercury emission line and neon emission line).

When the halogen lamp 28 and the deuterium lamp 30 are turned on, the light rays from the halogen lamp 28 and the deuterium lamp 30 enter the interior of the integrating sphere 12 from the first optical ports 16a and 16b and the second optical ports 14a and 14b, reach the radiance reference plane 18 after being multiple reflected, and exit to the outside from the radiance reference plane 18. The spectral radiance meter 40 to be calibrated is placed at a position that is a predetermined distance away from the radiance reference plane 18 to be opposed to the radiance reference plane 18, and is calibrated by measuring the light rays.

As described later, at the position of the spectral radiance meter 40, a spectral irradiance standard lamp 32 can be placed to calibrate sensitivity of the built-in spectral irradiance meter 24. The spectral irradiance standard lamp 82 is a lamp calibrated to have predetermined wavelength characteristics by a specified operator.

All of the halogen lamp 28, the deuterium lamp 30, the built-in spectral irradiance meter 24, the light source for wavelength calibration 26, the spectral radiance meter 40, and the spectral irradiance standard lamp 32 are connected to a controller 34, which is formed of a computer. As a result, the controller 34 may control lighting of the halogen lamp 28, the deuterium lamp 30, the light source for wavelength calibration 26, and the spectral irradiance standard lamp 32. The controller 34 may acquire an irradiance measured by the built-in spectral irradiance meter 24, or calibrate the built-in spectral irradiance meter 24. The controller 34 may further acquire the radiance measured by the spectral radiance meter 40 to be calibrated, or calibrate the spectral radiance meter 40 to be calibrated.

Figure 4:
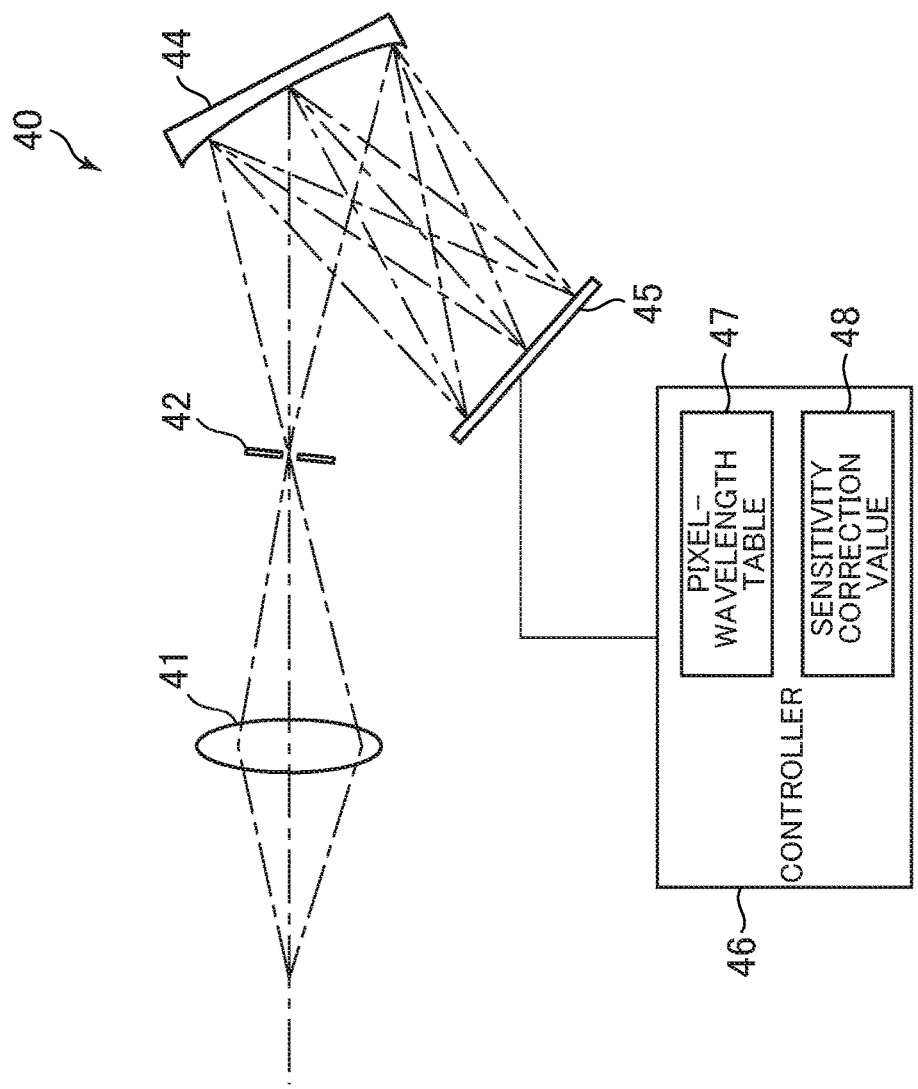
FIG. 4 is a configuration diagram of a spectral radiance meter to be calibrated.

FIG. 4 is a diagram for illustrating a configuration example of the spectral radiance meter 40 to be calibrated. The spectral radiance meter 40 to be calibrated illustrated in FIG. 4 is a so-called polychromator, a light ray to be measured, which is guided to an entrance slit 42 through a converging optical system 41, is diffracted by a concave-surface diffraction grating 44, and the diffracted light ray reaches a receiving sensor array 45. On the receiving sensor array 45, a wavelength-dispersed image is formed, and hence an output value of each pixel of the receiving sensor array 45 is converted into a radiance of a corresponding wavelength. In other words a controller 46, which is connected to the receiving sensor array 45, includes a pixel-wavelength table storage unit 47 and a sensitivity correction value storage unit 48. The pixel-wavelength table storage unit 4 is configured to store which pixel corresponds to which wavelength. Meanwhile, the sensitivity correction value storage unit 48 is configured to store a coefficient for converting the output value of each pixel into the radiance. In a calibration system according to this embodiment, the controller 34 updates a pixel-wavelength table to perform wavelength calibration of the spectral radiance meter 40 to be calibrated, and updates a sensitivity correction value to perform sensitivity calibration of the spectral radiance meter 40 to be calibrated. The built-in spectral irradiance meter 24 has a similar configuration.

Figure 5:
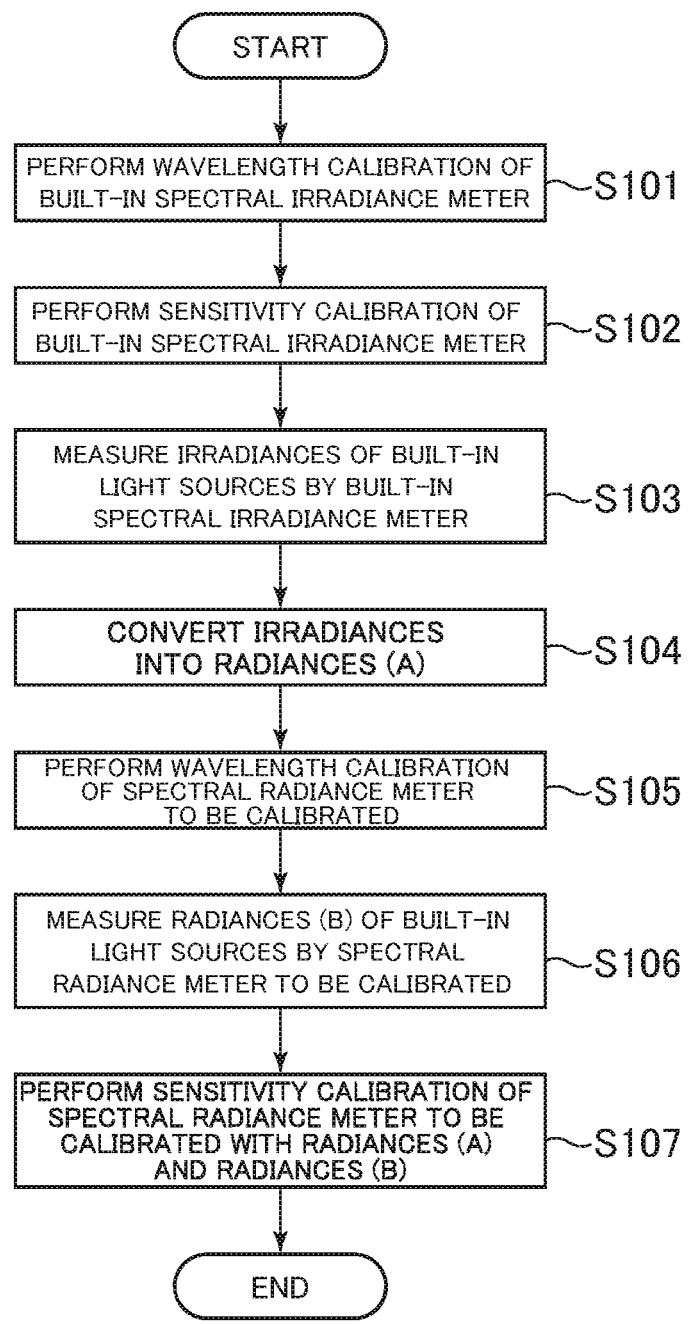
FIG. 5 is a flow chart for illustrating a method of calibrating the spectral radiance meter according to the embodiment of the present invention.

FIG. 5 is a flow chart for illustrating a calibration method using the calibration system. Steps illustrated in FIG. 5 are executed in the stated order by the controller 34, but may be executed manually by a calibration operator. First, in this calibration method, wavelength calibration of the built-in spectral irradiance meter 24 is performed first (S101). Specifically, the controller 34 turns on the light source for wavelength calibration 26 to allow the light ray having the known wavelength peak to enter the interior of the integrating sphere 12. Moreover, a spectral irradiance of the incident light ray is measured by the built-in spectral irradiance meter 24, and the pixel-wavelength table, which is stored in the built-in spectral irradiance meter 24, is updated so that the wavelength peak matches a known value.

Next, sensitivity calibration of the built-in spectral irradiance meter 24 is performed (S102). Specifically, the controller 34 places the spectral irradiance standard lamp 32 at a position that is in front of the radiance reference plane 18 and that is a predetermined distance away from the radiance reference plane 18, and turns on the spectral irradiance standard lamp 32. As a result, the spectral irradiance standard lamp 32 irradiates the radiance reference plane 18 with a known spectral irradiance. Movement of the spectral irradiance standard lamp 32 may be automated by electrical means or mechanical means, or may be manually performed by the calibration operator through display of a guide message or the like. Next, the controller 34 measures the spectral irradiance with the built-in spectral irradiance meter 24. Then, the sensitivity correction value stored in the built-in spectral irradiance meter 24 is updated so that a radiance at each wavelength matches a known radiance of the spectral irradiance standard lamp 32.

Next, the built-in spectral irradiance meter 24 that has gone through the wavelength calibration and the sensitivity calibration as described above is used to measure spectral irradiances of the light rays emitted by the halogen lamp 28 and the deuterium lamp 30 (S103). Specifically, the controller 34 turns on the halogen lamp 28 and the deuterium lamp 30, and causes the built-in spectral irradiance meter 24 to measure the spectral irradiances, to thereby acquire measured values.

Next, the controller 34 converts the spectral irradiances measured by the built-in spectral irradiance meter 24 into spectral radiances with an irradiance-radiance table (S104). In this calibration method, a spectral radiance meter that has been calibrated in advance at a factory or a service base of a manufacturing company is prepared. After Steps S101, S102, and S103 described above are complete, the calibrated spectral radiance meter is placed at the position of placement of the spectral radiance meter 40 to be calibrated, and the halogen lamp 28 and the deuterium lamp 30 are turned on. Further, the spectral irradiance are measured by the built-in spectral irradiance meter 24, and at the same time, spectral radiances are measured by the calibrated spectral radiance meter. Then, the thus-measured spectral irradiances and spectral radiances are associated with each other to obtain the irradiance-radiance table, that is, a conversion, factor for the irradiance and the radiance for each wavelength in advance. The irradiance-radiance table is stored in the controller 34 in advance. In Step S104, the irradiance at each wavelength, which is obtained by the built-in spectral irradiance meter 24, is multiplied by the conversion factor, which is included in the irradiance-radiance table, to obtain the radiance, that is, the spectral radiance at each wavelength.

Next, the controller 34 performs wavelength calibration of the spectral radiance meter 40 to be calibrated (S105). Specifically, after the spectral irradiance standard lamp 32 is retracted from the front of the radiance reference plane 18, a guide message is displayed for the calibration operator so that the spectral radiance meter 40 to be calibrated is placed in front of the radiance reference plane 18 and at a predetermined distance away from the radiance reference plane 18. Further, the controller 34 turns on the light source for wavelength calibration 26, and causes the spectral radiance meter 40 to be calibrated to measure a spectral radiance. Then, the pixel-wavelength table, which is stored in the pixel-wavelength table storage unit 47 of the spectral radiance meter 40 to be calibrated, is updated so that the measured wavelength peak matches the known value.

Next, the controller 34 uses the spectral radiance meter 40 to be calibrated that has gone through the wavelength calibration as described above to measure spectral radiances of the light rays emitted by the halogen lamp 28 and the deuterium lamp 30 (S106). Specifically, the controller 34 turns on the halogen lamp 28 and the deuterium lamp 30, and causes the spectral radiance meter 40 to be calibrated to measure the spectral radiances, to thereby acquire measured values.

Thereafter, the controller 34 updates the sensitivity correction value stored in the sensitivity correction value storage unit 48 of the spectral radiance meter 40 to be calibrated so that the spectral radiances measured in Step S106 match the spectral radiances obtained in Step S104 (S107).

According to the reference light source device 10 in this embodiment, as described above, the light rays having the same wavelength characteristics are allowed to enter the interior of the integrating sphere 12 from the first optical ports 16a and 16b, which are apart from each other, with the result that, as compared to a case where the light rays are allowed to enter from only one point, radiance unevenness on the radiance reference plane 18 can be suppressed. In particular, the first optical ports 16a and 16b are formed at positions on the outer walls of the integrating sphere 12 that are equidistant from the center of the radiance reference plane 18 and that have rotational symmetry with respect to the rotational symmetry axis R, with the result that the radiance unevenness on the radiance reference plane 18 can be suppressed more effectively. Similarly, also for the light rays that are allowed to enter from the second optical ports 14a and 14b, the radiance unevenness on the radiance reference plane 18 can be suppressed.

Figure 6A:
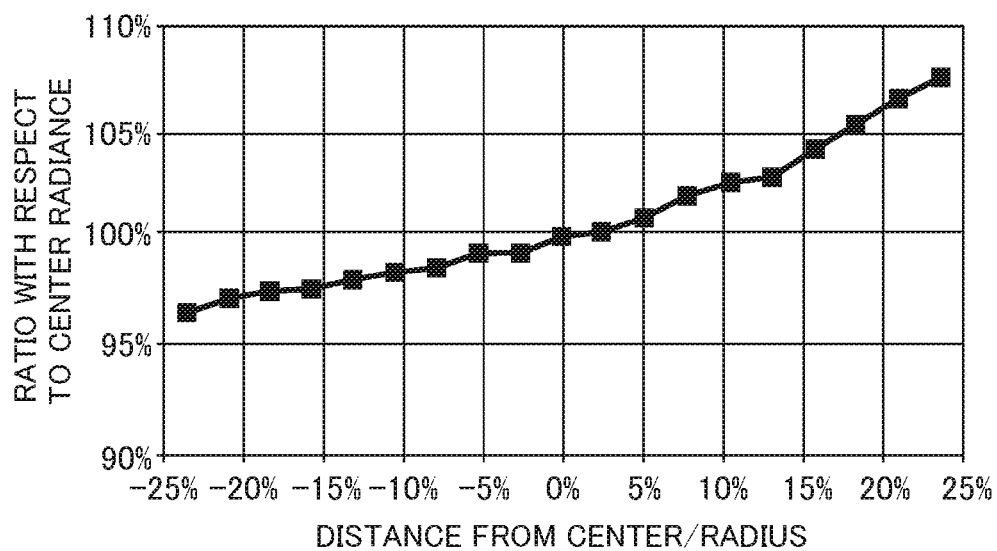
FIGS. 6A and 6B are graphs for showing evenness of a radiance on a radiance reference plane.
Figure 6B:
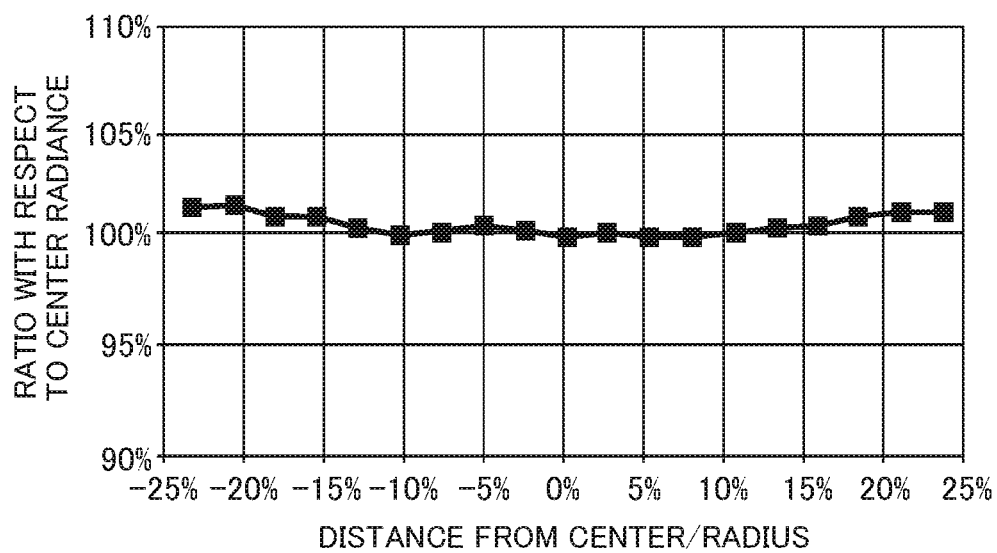

FIG. 6 are graphs for showing evenness of a radiance on the radiance reference plane 18. FIG. 6(a) is a graph for showing radiance unevenness in a case where a light ray is allowed to enter from the first optical, port 16a, and FIG. 6(b) is a graph for showing radiance unevenness in a case where light rays are allowed to enter from both the first optical ports 16a and 16b. The horizontal axis indicates a distance from the center of the radiance reference plane 18 to a measurement position with respect to a radius of the radiance reference plane 18 in percentage. The vertical axis indicates the radiance at the measurement position with respect to a radiance at the center of the radiance reference plane 18 in percentage. The measurement was performed by moving, on a line connecting the center of the first optical port 16a and the center of the radiance reference plane 18, from a position 25% away from the center of the radiance reference plane 18 to a position 25% closer to the center. As can be seen from FIGS. 6(a) and 6(b), the light rays emitted from the first optical ports 16a and 16b overlap each other to significantly reduce the radiance unevenness on the radiance reference plane 18.

In addition, as described above, with the reference light source device 10, the radiance unevenness on the radiance reference plane 18 can be significantly reduced, with the result that, according to this embodiment, without using a precalibrated spectral radiance meter, the spectral irradiance measured by the built-in spectral irradiance meter 24 can be used to accurately calibrate the spectral radiance meter 40 to be calibrated. In other words, as described above, the spectral radiance meter is generally configured to perform spot measurement with a small angle of measurement, and hence when the radiance unevenness on the radiance reference plane 18 is large, a measured radiance value greatly differs depending on where on the radiance reference plane 18 the spectral radiance meter is actually directed to. Therefore, when a calibrated spectral irradiance meter and the calibrated spectral radiance meter are used to create the irradiance-radiance table, unless the spectral radiance meter 40 to be calibrated measures a radiance at exactly the same position as a measurement position of the calibrated spectral radiance meter, reliability of the calibration is not assured. According to this embodiment, with the radiance unevenness on the radiance reference plane 18 being significantly reduced, even when the spectral radiance meter 40 to be calibrated actually measures a radiance at a position deviated from the measurement position of the calibrated spectral radiance meter at the time of creating the irradiance-radiance table, the difference is small, and hence the reliability of the calibration can be maintained.

In addition, the built-in spectral irradiance meter 24 can be calibrated easily using the spectral irradiance standard lamp 32, with the result that the calibration can be performed while traceability with the spectral irradiance standard lamp 32 is ensured on the user side as well as the factory and the service base of the manufacturing company.

In addition, according to this embodiment, the light rays having different wavelength characteristics are allowed to enter from the first optical ports 16a and 16b and the second optical ports 14a and 14b, with the result that spectral radiation calibration can be performed over a wide range of wavelengths. When the halogen lamp 28 and the deuterium lamp 30 are used as described above, the spectral radiation calibration can be performed over a wide range of wavelengths from the ultraviolet region to an infrared region.

In addition, the irradiance of the reference light source device 10 can be measured as occasion demands by the built-in spectral irradiance meter 24, with the result that the spectral radiance meter 40 to be calibrated can be calibrated with a plurality of radiance values by changing amounts of light of the halogen lamp 28 and the deuterium lamp 30. Further, even when a reflectance of the inner surface of the integrating sphere 12 is reduced, the spectral radiation calibration can be performed with high reliability.

The present invention is not limited to the embodiment described above, and various modifications can be made to the present invention.

Figure 7:
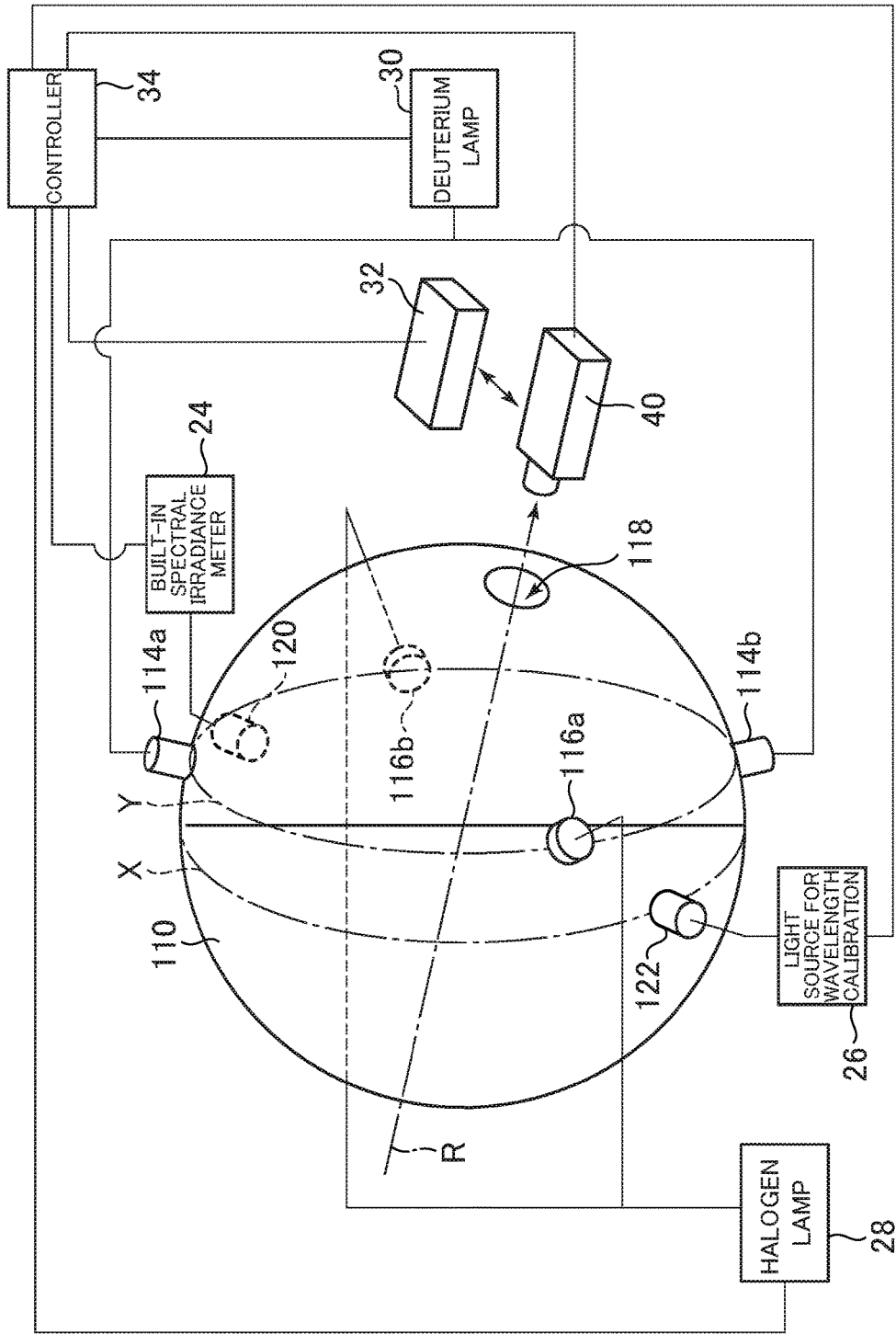
FIG. 7 is an overall diagram of a reference light source device according to a first modification example of the present invention, and a calibration system using the same.
Figure 8:
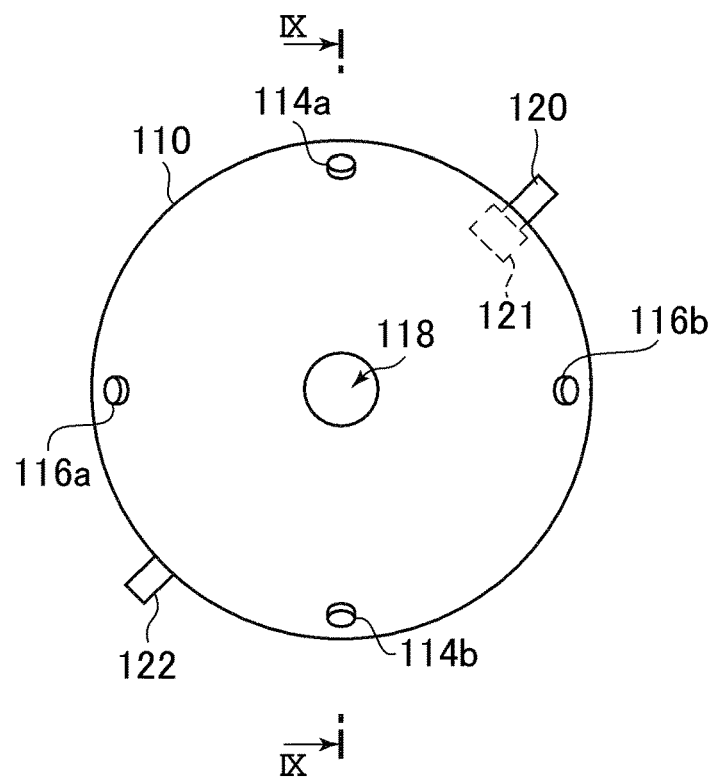
FIG. 8 is a plan view of the reference light source device according to the first modification example.
Figure 9:
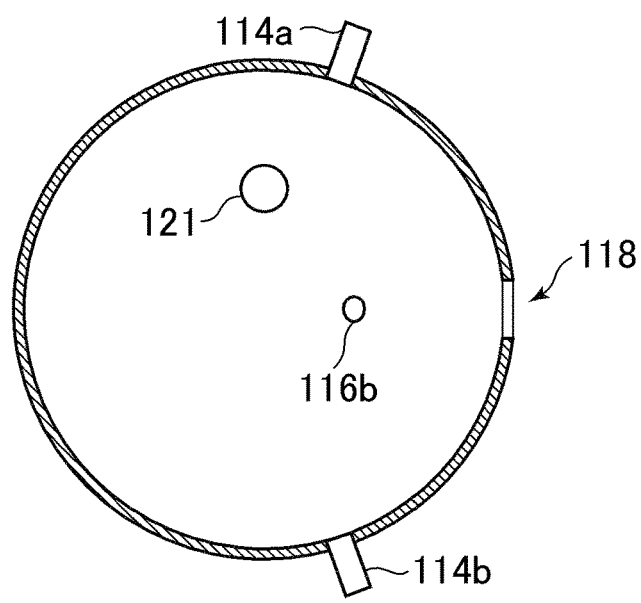
FIG. 9 is a cross-sectional view taken along the line IX-IX of FIG. 8.

FIG. 7 is an overall diagram of a reference light source device according to a first modification example of the present invention, and a calibration system using the same. FIG. 8 is a plan view of the reference light source device according to the first modification example when viewed from the radiance reference plane 118 side. FIG. 9 is a cross-sectional view taken along the line IX-IX of FIG. 8. In FIG. 7, a reference light source device 110 is illustrated in a perspective view. The first modification example is different from the calibration system illustrated in FIG. 1 only in the reference light source device 110. Therefore, other elements are denoted by the same reference symbols as in FIG. 1, and a detailed description thereof is omitted here.

The reference light source device 110 includes an integrating sphere 112 having a complete spherical shape, in which the radiance reference plane 118, which is a circular opening, is formed at one point on the integrating sphere 112, and the integrating sphere 112 has a three-dimensional shape that has n-fold symmetry (n is any integer of 2 or more) with respect to the rotational symmetry axis R that passes through the center of the radiance reference plane 118 and the center of the integrating sphere 112.

First optical ports 116a and 116b are formed at positions on an outer wall of the integrating sphere 112 that are equidistant from the center of the radiance reference plane 118 and that has rotational symmetry with respect to the rotational symmetry axis R. Here, the first optical ports 116a and 116b are formed at positions evenly dividing, into two, a circle Y on the radiance reference plane 118 side of a circle X (equator) having the maximum radius among circles obtained by cutting the integrating sphere 112 by planes perpendicular to the rotational symmetry axis R so that output directions of light rays are directed to the center of the integrating sphere 112. Similarly, second optical ports 114a and 114b are also formed at positions on the outer wall of the integrating sphere 112 that are equidistant from the center of the radiance reference plane 118 and that have rotational symmetry with respect to the rotational symmetry axis R. Here, the second optical ports 114a and 114b are formed at positions equally dividing the circle Y into two so that output directions of light rays are directed to the center of the integrating sphere 112. In this example, the first optical ports 116a and 116b and the second optical ports 114a and 114b are formed at positions shifted from each other by 90°. On the outer wall of the integrating sphere 112, a measurement port 120 and a wavelength calibration port 122 are also formed. Here, the measurement port 120 and the wavelength calibration port 122 are formed at positions on the circle X that are shifted from each other by 180°. Mounting positions of the first optical ports 116a and 116b and the second optical ports 114a and 114b are not limited to those described above, and may be any plurality of positions as long as the positions are equidistant from the center of the radiance reference plane 118 and have rotational symmetry with respect to the rotational symmetry axis R of the integrating sphere 112 that passes through the center of the radiance reference plane 118. However, the following advantage is obtained when the first optical ports 116a and 116b and the second optical ports 114a and 114b are formed on the circle Y so that the output directions of the light rays are directed to the center of the integrating sphere 112. Specifically, there is no need to provide a light-shielding wall for preventing the emitted light rays (primary light rays) from directly reaching the radiance reference plane 118.

Also in the integrating sphere 112 according to the first modification example, the light ray from the halogen lamp 28 is allowed to enter the interior of the integrating sphere 112 from the first optical ports 116a and 116b that are apart from each other, and the light ray from the deuterium lamp 30 is allowed to enter the interior of the integrating sphere 112 from the second optical ports 114a and 114b that are apart from each other, with the result that, as compared to a case where each of the light rays is allowed to enter from only one point, radiance unevenness on the radiance reference plane 118 can be suppressed. The first optical ports 116a and 116b are formed at the positions on the outer wall of the integrating sphere 112 that are equidistant from the center of the radiance reference plane 118 and that have rotational symmetry with respect to the rotational symmetry axis R, with the result that the radiance unevenness on the radiance reference plane 118 can be suppressed more effectively. Similarly, also for the light rays that are allowed to enter from the second optical ports 114a and 114b, the radiance unevenness on the radiance reference plane 118 can be suppressed.

Figure 10:
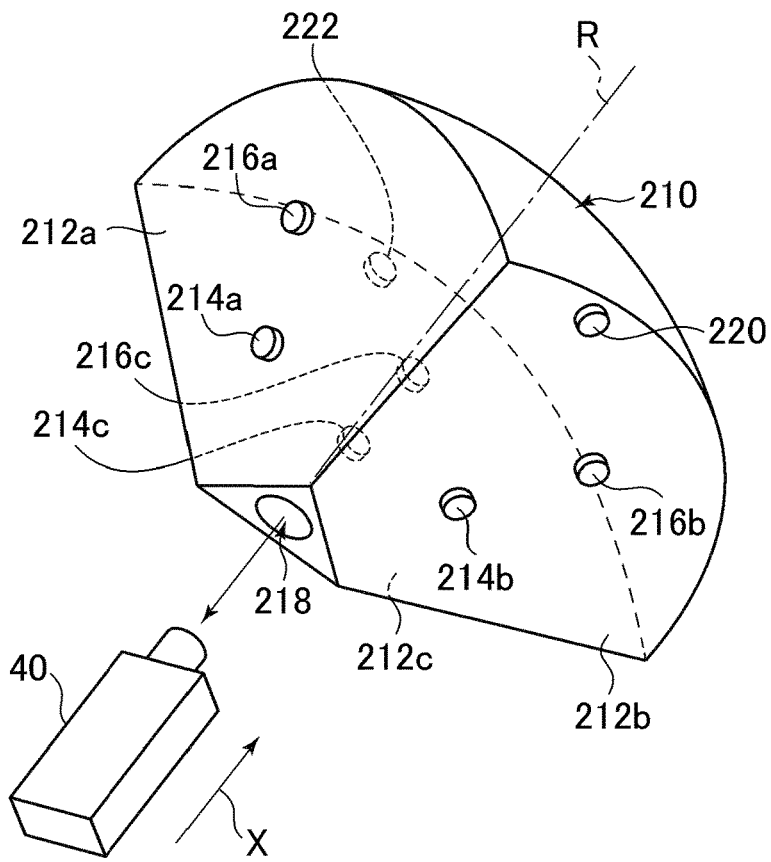
FIG. 10 is a perspective view for illustrating a reference light source device according to a second modification example of the present invention.
Figure 11:
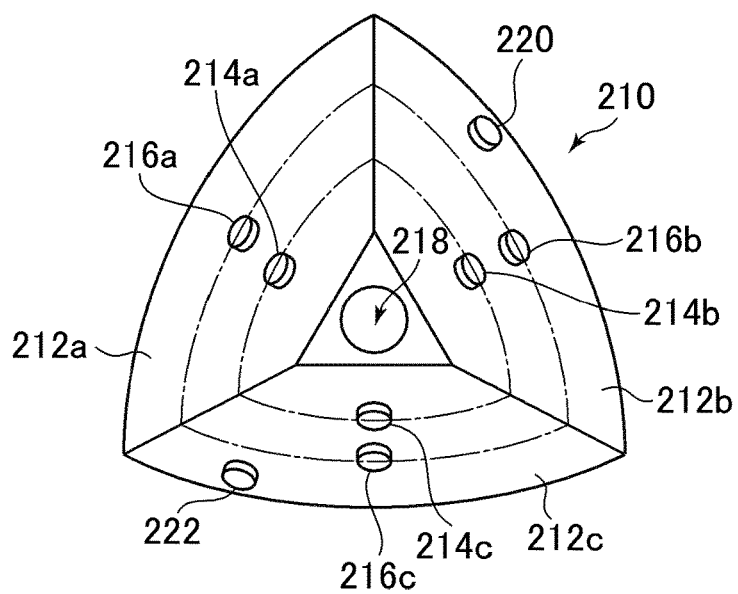
FIG. 11 is a plan view for illustrating the reference light source device according to the second modification example.

FIG. 10 is a perspective view for illustrating a reference light source device according to a second modification example of the present invention. In addition, FIG. 11 is a plan view of the reference light source device according to the second modification example when viewed from the arrow X side. A reference light source device 210 illustrated in FIG. 10 includes an integrating sphere 212 having a one-eighth spherical segment shape, and outer walls of the integrating sphere 212 are formed of sectoral plate portions 212a, 212b, and 212c and a one-eighth spherical segment shell portion 212d. Moreover, an angular portion to be formed by the plate portions 212a, 212b, and 212c is cut off by a plane perpendicular to the rotational symmetry axis R, and a radiance reference plane 218, which is a circular opening, is formed on the plane so that its center matches the rotational symmetry axis R. Inner surfaces of the plate portions 212a, 212b, and 212c, and an inner surface of an exterior wall portion in which the radiance reference plane 218 is formed are all mirrors formed by aluminum vapor deposition or the like. An inner surface of the one-eighth spherical segment shell portion 212d is a white, highly diffuse-reflective surface made of barium sulfate, a PTFE sinter, or the like. The integrating sphere 212 has a three-dimensional shape that has 3-fold symmetry with respect to the rotational symmetry axis R. With the integrating sphere 212 having the one-eighth spherical segment shape, the device can be made more compact, and an amount of light reaching the radiance reference plane 218 can be further increased.

A first optical port 216a is formed in the plate portion 212a, a first optical port 216b is formed in the plate portion 212b, and a first optical port 216c is formed in the plate portion 212c. The first optical ports 216a, 216b, and 216c are equidistant from the center of the radiance reference plane 218, and have rotational symmetry (3-fold symmetry) with respect to the rotational symmetry axis R. Similarly, a second optical port 214a is formed next to the first optical port 216a in the plate portion 212a, a second optical port 214b is formed next to the first optical port 216b in the plate portion 212b, and a second optical port 214c is formed next to the first optical port 216c in the plate portion 212c. The second optical ports 214a, 214b, and 214c are also equidistant from the center of the radiance reference plane 218, and have rotational symmetry (3-fold symmetry) with respect to the rotational symmetry axis R.

A measurement port 220 is formed in the plate portion 212b, and a wavelength calibration port 222 is formed in the plate portion 212c. Also with the reference light source device 210 according to the second modification example, radiance unevenness on the radiance reference plane 218 can be suppressed.

Figure 12:
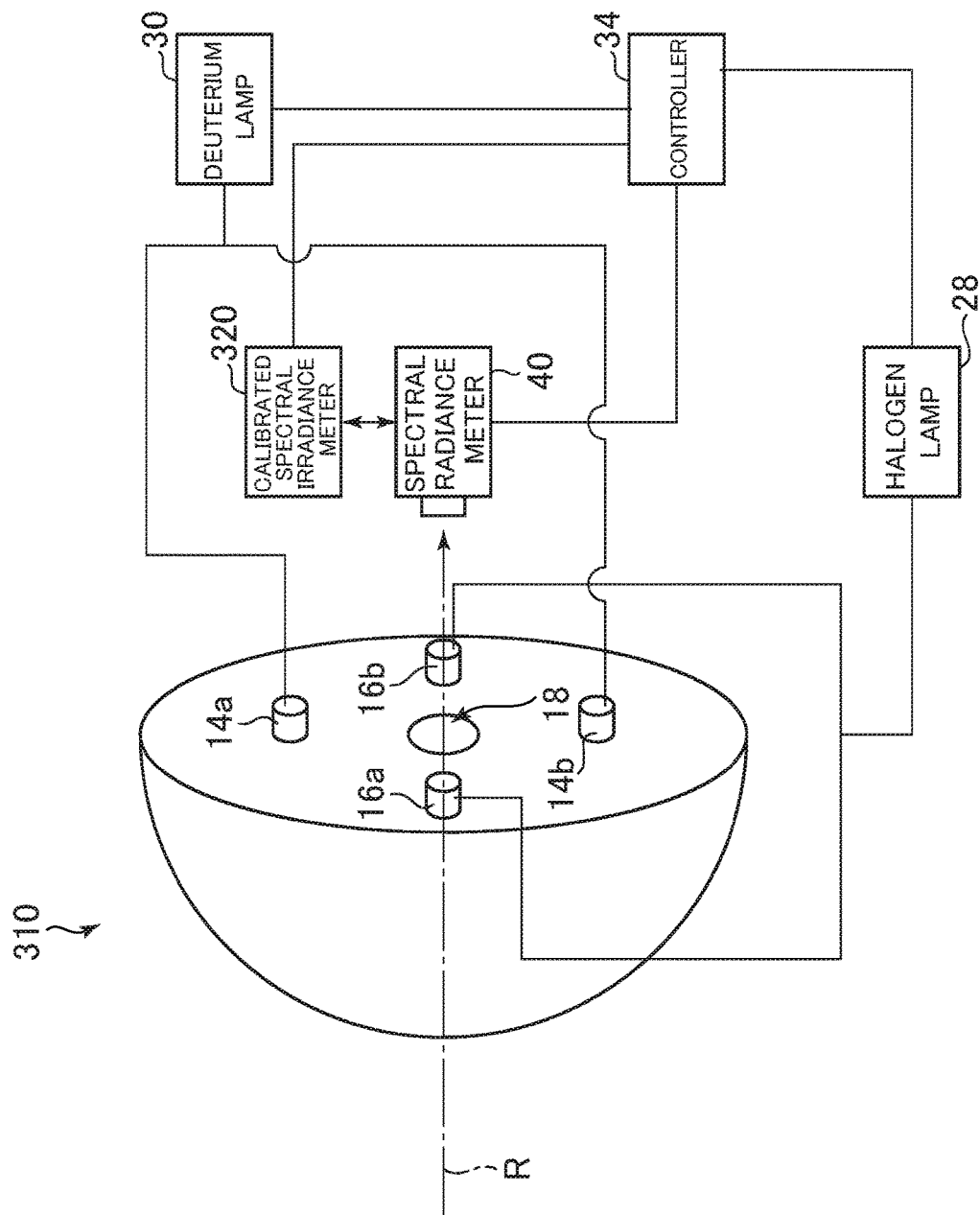
FIG. 12 is an overall diagram of a reference light scarce device according to a third modification example of the present invention, and a calibration system using the same.

FIG. 12 is an overall diagram of a reference light source device according to a third modification example of the present invention, and a calibration system using the same. The calibration system illustrated in FIG. 12 is different from the calibration system illustrated in FIG. 1 in that the measurement port 20, the built-in spectral irradiance meter 24, the wavelength calibration port 22, the light source for wavelength calibration 26, and the spectral irradiance standard lamp 32 are not provided to a reference light source device 310, and in that a calibrated spectral irradiance meter 320 is provided. Other elements are denoted by the same reference symbols as in FIG. 1, and a detailed description thereof is omitted here.

The reference light source device 310 illustrated in FIG. 12 also has a half spherical shape, but the built-in spectral irradiance meter 24 and the light source for wavelength calibration 26 are not connected thereto as described above. Instead, the spectral radiance meter 40 to be calibrated can be calibrated by measuring the irradiance of the radiance reference plane 18 with the calibrated spectral irradiance meter 320. The calibrated spectral irradiance meter 320 is calibrated in advance with the light source for wavelength calibration, for example, the spectral irradiance standard lamp, the mercury lamp, or the neon lamp.

Figure 13:
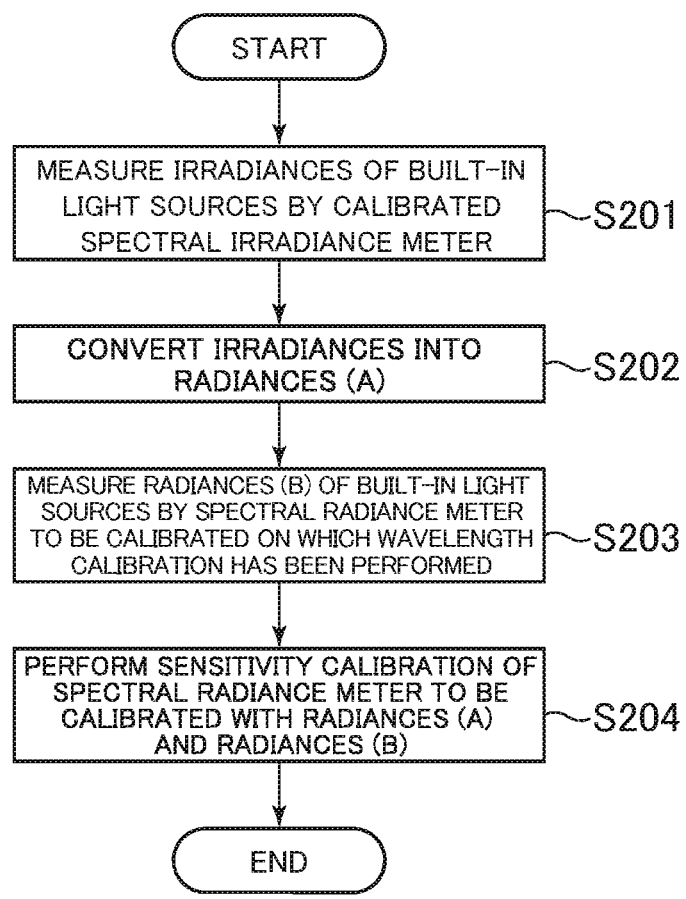
FIG. 13 is a flow chart for illustrating a method of calibrating the spectral radiance meter using the calibration system illustrated in FIG. 12.

FIG. 13 is a flow chart for illustrating a method of calibrating the spectral radiance meter using the calibration system illustrated in FIG. 12. As illustrated in FIG. 13, in this method, spectral irradiances of light rays emitted by the halogen lamp 28 and the deuterium lamp 30 are first measured by the calibrated spectral irradiance meter 320 (S201). Specifically, the controller 34 turns on the halogen lamp 28 and the deuterium lamp 30, and causes the calibrated spectral irradiance meter 320 to measure the spectral irradiances, to thereby acquire measured values.

Next, the controller 34 converts the spectral irradiances measured by the calibrated spectral irradiance meter 320 into spectral radiances with the irradiance-radiance table (S202). In this example, a spectral irradiance meter and a spectral radiance meter that have been calibrated in advance are prepared, and the calibrated spectral irradiance meter is arranged at a position that is in front of the radiance reference plane 18 and that is a predetermined distance away from the radiance reference plane 18 to measure the spectral irradiances of the light rays emitted from the halogen lamp 28 and the deuterium lamp 30. Moreover, the calibrated spectral radiance meter is arranged at a position that is in front of the radiance reference plane 18 and that is a predetermined distance away from the radiance reference plane 18 to measure the spectral radiance of the light rays emitted from the halogen lamp 28 and the deuterium lamp 30. Then, the thus-measured spectral irradiances and spectral radiances are associated with each other to obtain the irradiance-radiance table, that is, the conversion factor for the irradiance and the radiance for each wavelength in advance. The irradiance-radiance table is stored in the controller 34 in advance. In Step S202, the irradiance at each wavelength, which is obtained by the calibrated spectral irradiance meter 320, is multiplied by the conversion factor, which is included in the irradiance-radiance table, to obtain the radiance, that is, the spectral radiance at each wavelength.

Next, the controller 34 uses the spectral radiance meter 40 to be calibrated to measure spectral radiances of the light rays emitted by the halogen lamp 28 and the deuterium lamp 30 (S203). Specifically, the controller 34 prompts, through display of a guide message or the like, the calibration operator to arrange the spectral radiance meter 40 to be calibrated in front of the radiance reference plane 18 and a predetermined distance away from the radiance reference plane 18. Further, the controller 34 turns on the halogen lamp 28 and the deuterium lamp 30, and causes the spectral radiance meter 40 to be calibrated to measure spectral radiances, to thereby acquire measured values.

Thereafter, the controller 34 updates the sensitivity correction value stored in the sensitivity correction value storage unit 48 of the spectral radiance meter 40 to be calibrated so that the spectral radiances measured in Step S203 match the spectral radiances obtained in Step S202 (S204).

As described above, even when the built-in spectral irradiance meter 24 and the like are not provided, the radiance reference plane 18 on which the radiance unevenness is suppressed can be used to perform the spectral radiation calibration with high reliability. Among the spectral radiance meters 40 to be calibrated, a spectral radiance meter 40 capable of being operated as a spectral irradiance meter by mounting a diffuser and other such optical systems in front of the converging optical system is also commercially available. In the case of such spectral radiance meter 40 to be calibrated, the spectral radiance meter 40 to be calibrated operating as the spectral irradiance meter may be calibrated in advance by the light source for wavelength calibration, for example, the spectral irradiance standard lamp, the mercury lamp, or the neon lamp, and be used as the calibrated spectral irradiance meter 320. A range of measured wavelengths of the calibrated spectral irradiance meter 320 needs to be a wide range of wavelengths that is equivalent to or more than the range of measured wavelengths of the spectral radiance meter 40 to be calibrated.

Moreover, in the above description, the halogen lamp 28 and the deuterium lamp 30 are used as the first light source and the second light source, respectively, but another light source, for example, an LED or a laser, may be used. Moreover, for the wavelength calibration, the light source for wavelength calibration 26 is used for ensuring reliability, but wavelength peaks of light rays from the first light source and the second light source may be used to perform the wavelength calibration. Moreover, the number of light sources is not limited to two, and three or more light sources may be used. Further, the light sources of the respective wavelength characteristics may be allowed to enter the interior of the integrating sphere from three or r lore optical ports. In this case also, it is desired that positions of the respective optical ports be determined so as to be equidistant form the center of the radiance reference plane and have rotational symmetry with respect to the rotational symmetry axis R. For example, in the example of FIG. 1, three optical ports may be arranged at positions on a circle concentric with the circular plate portion 12b that are shifted from one another by 120°. The increase in number of optical ports can suppress the radiance unevenness on the radiance reference plane even more effectively.

In addition, the reference light source device according to the present invention is applicable net only to the calibration method according to the present invention, but also to another calibration method. For example, the reference light source device according to the present invention is applicable even to a case where, without using the spectral irradiance meter, the spectral radiance meter 40 to be calibrated is calibrated with the spectral radiance measured by the calibrated spectral radiance meter and the spectral radiance measured by the spectral radiance meter 40 to be calibrated. In this case also, the radiance unevenness on the radiance reference plane 18 is suppressed, and hence the spectral radiation calibration can be performed with higher reliability.

The invention claimed is:

1. A reference light source device, which is used for calibration of a spectral radiance meter, the reference light source device comprising:
    an integrating sphere having a radiance reference plane, which is an opening; and
    a plurality of first optical ports, which are formed apart from each other in an outer wall of the integrating sphere to allow light rays with equivalent wavelength characteristics to enter an interior of the integrating sphere,
    a single light source configured to supply a light ray to each of the plurality of first optical ports through an optical fiber,
    wherein the light rays emitted from the plurality of first optical ports overlap each other on the radiance reference plane,
    wherein the plurality of first optical ports include one first optical port and another first optical port,
    wherein the positions of the one first optical port and the another first optical port are equidistant from the center of the radiance reference plane and have 2-fold symmetry or 3-fold symmetry with respect to a rotational symmetry axis R,
    wherein the radiance reference plane is formed by a circular opening at a center of the integrating sphere; and
    a light ray emitted from the one first optical port and a light ray emitted from the another first optical port are irradiated on the radiance reference plane at a same time.

2. The reference light source device according to claim 1, wherein the plurality of first optical ports are formed at a plurality of positions on the outer wall of the integrating sphere that are equidistant from a center of the radiance reference plane and that have rotational symmetry with respect to a rotational symmetry axis of the integrating sphere passing through the center of the radiance reference plane.

3. The reference light source device according to claim 2,
    wherein the integrating sphere comprises a complete spherical shape, and
    wherein the plurality of first optical ports are formed at a plurality of positions evenly dividing a circle on the radiance reference plane side of a circle, the circle comprising a maximum radius among circles obtained by cutting the integrating sphere by planes perpendicular to the rotational symmetry axis.

4. The reference light source device according to claim 2,
    wherein the integrating sphere comprises a half spherical shape including a circular plate having the radiance reference plane at a center of the circular plate, and
    wherein the plurality of first optical ports are formed at a plurality of positions on the circular plate, the plurality of positions evenly divide a circle concentric with the circular plate.

5. The reference light source device according to claim 1, wherein the optical fiber has an equal length from the single light source to the each of the plurality of first optical ports.

6. The reference light source device according to claim 1, further comprising a plurality of second optical ports, which are formed apart from each other in the outer wall of the integrating sphere to allow light rays with equivalent wavelength characteristics to enter the interior of the integrating sphere, wherein the light rays with equivalent wavelength characteristics are different from the wavelength characteristics of the plurality of first optical ports.

7. The reference light source device according to claim 1, further comprising a measurement port, which is formed in the outer wall of the integrating sphere, and to which a spectral irradiance meter, which is configured to measure a spectral irradiance, is connected.

8. The reference light source device according to claim 1, further comprising a wavelength calibration port, which is formed in the outer wall of the integrating sphere, to which a light source for wavelength calibration is connected, and which allows a light ray having a known wavelength peak to enter the interior of the integrating sphere.

9. The reference light source device according to claim 8, wherein the wavelength calibration port is configured separately from the plurality of first ports.

10. The reference light source device according to claim 1, wherein the one first optical port and the another first optical port are oriented in different directions.

11. A method of calibrating a spectral radiance meter using an integrating sphere having a radiance reference plane, which is an opening; and also using a plurality of first optical ports, which are formed apart from each other in an outer wall of the integrating sphere to allow light rays with equivalent wavelength characteristics to enter an interior of the integrating sphere, the method comprising the steps of:

supplying a light ray using a single light source, to each of the plurality of first optical ports through an optical fiber, measuring a radiance of the radiance reference plane with a spectral radiance meter to be calibrated;

measuring an irradiance of the radiance reference plane with a calibrated spectral irradiance meter; and calibrating the spectral radiance meter to be calibrated based on the measured radiance, the measured irradiance, and a relationship between the radiance and the irradiance, wherein the light rays emitted from the plurality of first optical ports overlap each other on the radiance reference plane, wherein the plurality of first optical ports include one first optical port and another first optical port, wherein the positions of the one first optical port and the another first optical port are equidistant from the center of the radiance reference plane and have 2-fold symmetry or 3-fold symmetry with respect to a rotational symmetry axis R, wherein the radiance reference plane is formed by a circular opening at a center of the integrating sphere; and a light ray emitted from the one first optical port and a light ray emitted from the another first optical port are irradiated on the radiance reference plane at a same time.

12. The method according to claim 11, wherein the step of calibrating comprises converting the measured irradiance into a radiance based on the relationship.

13. The method according to claim 11, wherein the relationship is obtained by associating an irradiance of the radiance reference plane, which is measured by the calibrated spectral irradiance meter, and a radiance of the radiance reference plane, which is measured by the calibrated spectral radiance meter.

14. The method according to claim 11, wherein the calibrated spectral irradiance meter is obtained by calibrating, with a spectral irradiance standard lamp, the spectral radiance meter to be calibrated, to which an optical system for using the spectral radiance meter to be calibrated as a spectral irradiance meter is mounted.

* * * * *